(12) United States Patent
Wang et al.

(10) Patent No.: US 12,314,120 B2
(45) Date of Patent: May 27, 2025

(54) SYSTEM AND METHOD FOR PREDICTING SYSTEM FAILURE AND TIME-TO-FAILURE BASED ON ATTRIBUTION SCORES OF LOG DATA

(71) Applicant: Dell Products L.P., Round Rock, TX (US)

(72) Inventors: Dale Wang, Hayward, CA (US); Min Gong, Shanghai (CN); Ashok Narayanan Potti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 73 days.

(21) Appl. No.: 18/161,190

(22) Filed: Jan. 30, 2023

(65) Prior Publication Data

US 2024/0256371 A1    Aug. 1, 2024

(51) Int. Cl.
  *G06F 11/00* (2006.01)
  *G06N 5/04* (2023.01)
(52) U.S. Cl.
  CPC .......... *G06F 11/006* (2013.01); *G06F 11/008* (2013.01); *G06N 5/04* (2013.01)
(58) Field of Classification Search
  CPC ........ G06F 11/006; G06F 11/008; G05N 5/04
  See application file for complete search history.

(56) References Cited

U.S. PATENT DOCUMENTS

| | | | |
|---|---|---|---|
| 8,538,897 B2 | 9/2013 | Han et al. | |
| 10,572,329 B2 | 2/2020 | Harutyunyan et al. | |
| 10,740,793 B1 | 8/2020 | Sussman et al. | |
| 10,776,196 B2 | 9/2020 | Ohana et al. | |
| 10,853,867 B1 | 12/2020 | Bulusu et al. | |
| 11,513,930 B2 | 11/2022 | Chan et al. | |
| 11,720,940 B2 | 8/2023 | Lakshminarayan et al. | |
| 11,734,102 B1 | 8/2023 | Wang et al. | |
| 11,909,836 B2 | 2/2024 | Wulf et al. | |

(Continued)

FOREIGN PATENT DOCUMENTS

| | | | |
|---|---|---|---|
| CN | 108280168 A | 7/2018 | |
| CN | 111476371 A | 7/2020 | |

(Continued)

*Primary Examiner* — Marc Duncan
(74) *Attorney, Agent, or Firm* — WOMBLE BOND DICKINSON (US) LLP

(57) ABSTRACT

Methods and systems for managing data processing systems based on indications of a failure are disclosed. A data processing system may include and depend on the operation of hardware and/or software components. To manage the operation of the data processing system, a data processing system manager may obtain logs for components of the data processing system that reflect the historical and/or current operation of these components. Inference models may be implemented to predict future system infrastructure issues (e.g., future component failures) using information recorded in the logs. The inference models may also predict times-to-failures associated with the future failures by assigning attribution scores to portions of logs. Further analysis of attribution scores may be performed to generate health scores for the data processing system, providing additional information for the determination of remedial actions that may reduce the likelihood of the data processing system becoming impaired.

20 Claims, 6 Drawing Sheets

(56) References Cited

U.S. PATENT DOCUMENTS

| | | | |
|---|---|---|---|
| 2009/0113248 A1 | 4/2009 | Bock et al. | |
| 2009/0216910 A1 | 8/2009 | Duchesneau | |
| 2010/0257058 A1 | 10/2010 | Karidi et al. | |
| 2010/0318856 A1 | 12/2010 | Yoshida | |
| 2013/0041748 A1 | 2/2013 | Hsiao et al. | |
| 2013/0198240 A1 | 8/2013 | Ameri-Yahia et al. | |
| 2015/0227838 A1* | 8/2015 | Wang | G16H 40/40 |
| | | | 706/12 |
| 2015/0288557 A1 | 10/2015 | Gates et al. | |
| 2019/0095313 A1 | 3/2019 | Xu et al. | |
| 2019/0129785 A1 | 5/2019 | Liu et al. | |
| 2020/0026590 A1* | 1/2020 | Lopez | G05B 23/0243 |
| 2021/0027205 A1 | 1/2021 | Sevakula et al. | |
| 2021/0241141 A1* | 8/2021 | Dugger | H04L 41/14 |
| 2022/0100187 A1* | 3/2022 | Isik | G06N 3/08 |
| 2022/0283890 A1 | 9/2022 | Chopra et al. | |
| 2022/0358005 A1 | 11/2022 | Saha et al. | |
| 2022/0417078 A1* | 12/2022 | Matsuo | H04L 41/0876 |
| 2023/0016199 A1 | 1/2023 | Jividen et al. | |
| 2024/0028955 A1* | 1/2024 | Harutyunyan | G06N 5/04 |

FOREIGN PATENT DOCUMENTS

| | | |
|---|---|---|
| CN | 112541806 A | 3/2021 |
| EP | 4235505 A1 | 8/2023 |

\* cited by examiner

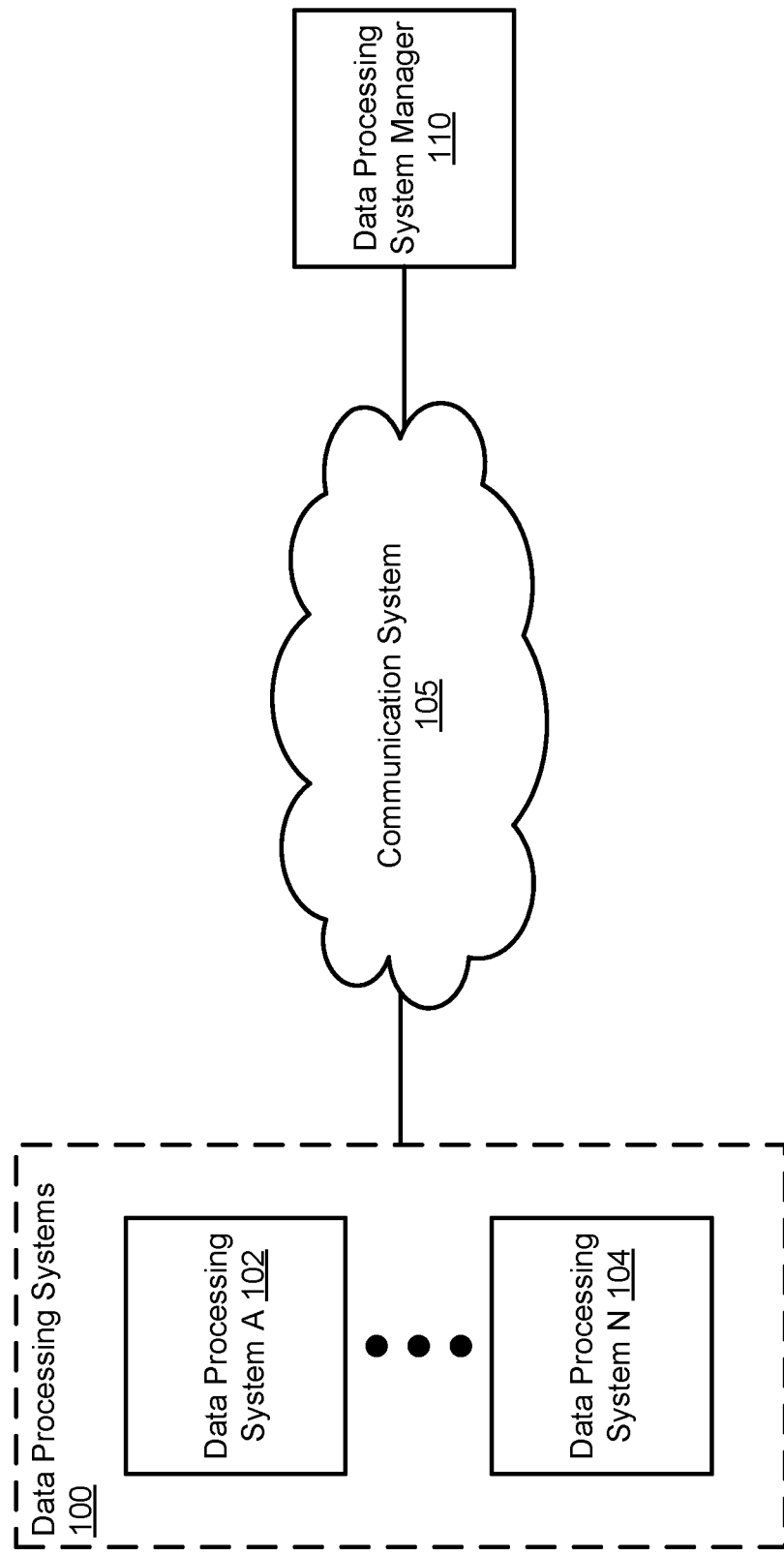

SYSTEM AND METHOD FOR PREDICTING SYSTEM FAILURE AND TIME-TO-FAILURE BASED ON ATTRIBUTION SCORES OF LOG DATA

FIELD

Embodiments disclosed herein relate generally to device management. More particularly, embodiments disclosed herein relate to systems and methods to manage the operation of devices through log analysis.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
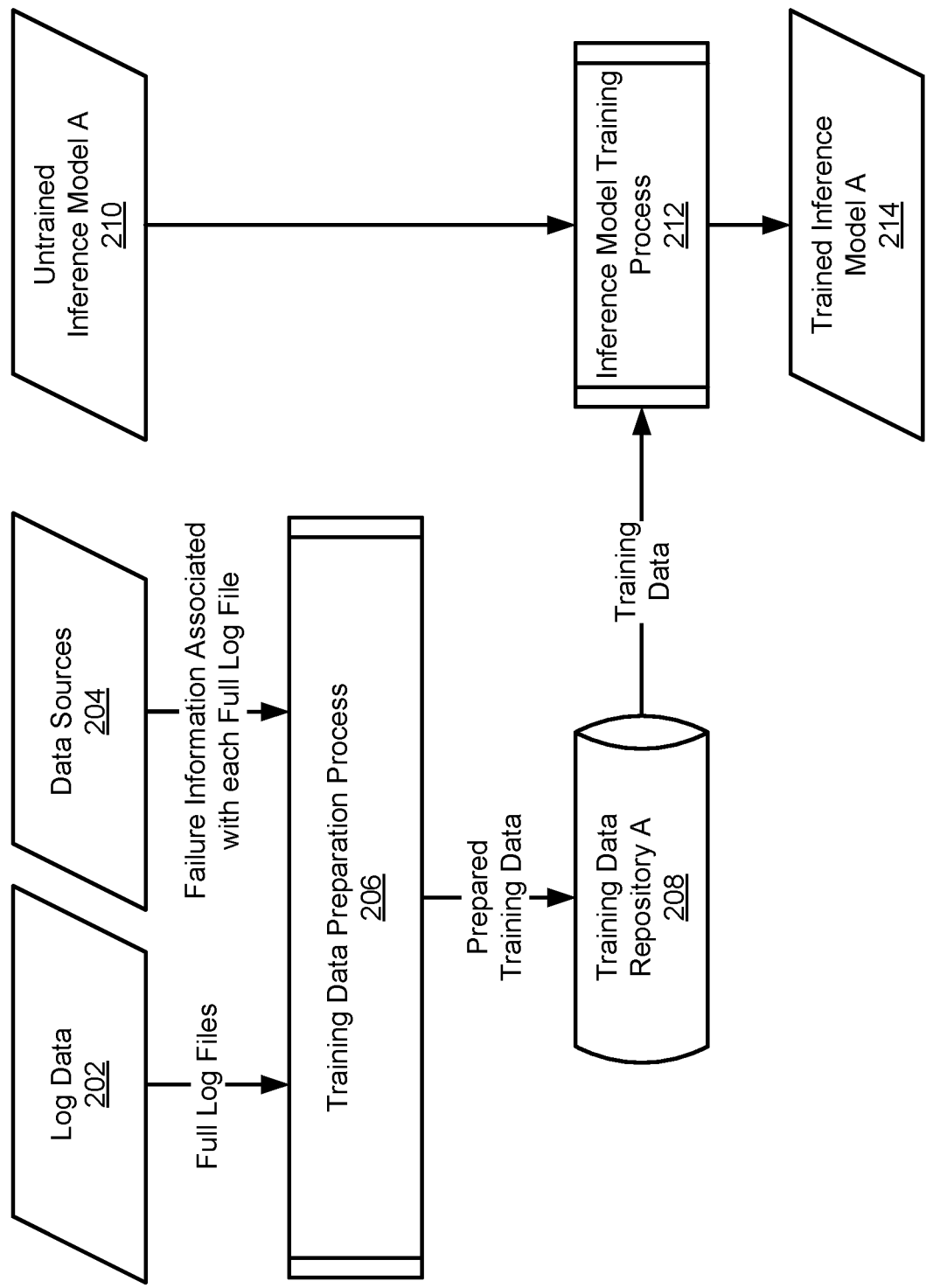
FIG. 2A shows a data flow diagram illustrating a process of obtaining a trained inference model in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems based on indications of a failure. A data processing system may include one or more hardware and/or software components. The operation of the data processing system may depend on the operation of these components. For example, improper operation of any of these components may impair (e.g., reduce performance, reduce functionality, etc.) the operation of the data processing system and/or contribute to a system failure.

To manage the operation of the data processing system, the system may include a data processing system manager. The data processing system manager may obtain log files for data processing systems reflecting the historical operation of these data processing systems. The historical log files may be used to predict the future operation of the data processing system (e.g., to predict the failure of a component that may result in a future undesired operation of the data processing system), and/or to provide other functions.

Log data may be analyzed using machine learning to obtain various types of inference models. The inference models may be used in sequence and/or conjunction to identify failure patterns (e.g., patterns that may lead to component failures) in large amounts of log data (e.g., ingest data). However, ingesting large amounts of log data (e.g., large log files) may be inefficient and may not result in timely failure detection.

Additionally, the identification of a future failure of the data processing system alone may not provide sufficient information for efficient and effective mitigation and/or prevention of the failure. To improve mitigation and/or prevention measures, additional failure information such as the time-to-failure and other risk factors (e.g., server health score) may be predicted. This additional failure information may allow for proper assessment of the predicted future failure, and to identify appropriate actions (e.g., cost-effective solutions) to remediate the failure and/or any other related system infrastructure issues.

The time-to-failure may be predicted using attribution score analysis. An inference model may be trained to assign attribution scores to log messages. Attribution scores may be used to identify portions of a log file (e.g., log segments) that contribute to the occurrence of a predicted future failure. The attribution scores may be analyzed to partition the identified portion of the log file into sub-portions, and the sub-portions may be used to (i) determine the time-to-failure for a predicted failure (e.g., using timestamp information recorded in the log file), (ii) improve the efficiency and timely detection of future failures (e.g., ingesting smaller amounts of data into an inference model), and/or (iii) determine the health scores (e.g., risk factors) of data processing systems.

Failure information such as times-to-failures and/or system health scores may provide an overview of data processing system health and may allow for more effective and cost-efficient remedial action sets. Remedial action sets may then be implemented for the mitigation and/or prevention of current infrastructural issues or similar issues that may be encountered in the future.

By doing so, an improved computing device and/or distributed system may be obtained. The improved device and/or system may have higher uptime and/or may be more resilient to impairment.

In an embodiment, a computer implemented method for managing data processing systems based on indications of a failure is provided. The method may include: obtaining new log data for a data processing system of the data processing systems, the new log data including log lines that indicate activity of the data processing system during a period of time; ingesting the new log data into a trained inference model to obtain an inference, the trained inference model being based on training data, the training data including relationships between portions of log lines of historical log files and times-to-failures corresponding to historical failures of the data processing systems, and the training data being based on attribution scores for each log line of the portions of the log lines. The inference may indicate a failure type for the data processing system and a time-to-failure for the data processing system.

The method may also include performing, based on the inference, an action set to reduce an impact of the failure.

The method may further include, prior to obtaining the new log data, performing a training process to obtain the trained inference model. The training process may include: obtaining a first inference model based on the historical log files, the first inference model being trained to generate a first prediction regarding the failure type; obtaining a second inference model based on the first inference model, the second inference model being trained to generate a second prediction regarding the time-to-failure; and, training a third inference model to generate the inference based on the first prediction and the second prediction to obtain the trained inference model.

Obtaining the first inference model may include: obtaining a first training data, the first training data comprising the historical log files and historical failure data, the historical failure data indicating types of past failures of data processing systems associated with the historical log files; and, training, using the first training data, the first inference model to generalize at least one relationship defined by the historical log files with associated types of past failures of the data processing systems.

The attribution scores may be based on interpretations of a first trained inference model, the interpretations indicating levels of contribution of the log lines of the historical log files to occurrences of the historical failures.

Each of the occurrences of the historical failures may be associated with the portion of the log lines corresponding to the historical failures, the times-to-failures corresponding to respective occurrences of the historical failures being based on a sub-portion of the portion of the log lines having an aggregate level of contribution based on the levels of contribution that exceeds a threshold.

The aggregate level of the contribution may be a cumulative sum of the levels of contribution.

The times-to-failures corresponding to the respective occurrences of the historical failures may be based on time deltas between a most recent log line of the sub-portion of the portion of the log lines and the respective occurrences of the historical failures.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a system in accordance with an embodiment is shown. The system shown in FIG. 1 may provide computer implemented services. The system may include data processing systems 100. Data processing systems 100 may include any number of computing devices that provide the computer implemented services. For example, data processing systems 100 may include one or more data processing systems 102, 104 that may independently and/or cooperatively provide the computer implemented services.

For example, all, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Different systems may provide similar and/or different computer implemented services.

To provide the computer implemented services, data processing systems 100 may host applications that provide these (and/or other) computer implemented services. The applications may be hosted by one or more of data processing systems 100.

Any of data processing systems 102-104, and components thereof, as well as hosted entities (e.g., applications that provide computer implemented services, other applications that manage the operation of data processing systems 100, etc.), may be subject to undesired operation. For example, due to various operating conditions, flaws in design, and/or for other reasons, any of these hardware and/or software components may operate in a manner that diverges from nominal (e.g., desired) operation.

When operating, any of these components may generate one or more logs. A log may be a data structure that includes operational information regarding data processing systems 100 such as, for example, descriptions of conditions encountered by a component, a time when the condition was encountered, an identifier associated with a condition and/or generator of the log, an indication of a relative level of importance or severity of the encountered conditions, and/or other types of information. While the logs may include information regarding the current operation of data processing systems 100, the logs may not specify whether portions of the log (e.g., log segments) are indicative of potential undesired operation of the data processing systems 100 and/or components thereof, and/or may lack other information that may be used to manage data processing systems 100. Rather, the logs may generally include a representation of current and/or past operation of all or a portion of data processing systems 100. Thus, the logs alone may not be useful for proactively addressing potential future undesirable operating conditions (e.g., component failures) of data processing systems 100, and/or causes of the potential undesired operation of data processing systems 100.

In general, embodiments disclosed herein may provide systems, devices, and methods for managing data processing systems to reduce the likelihood of the data processing systems operating in an undesired manner by identifying potential future failures and times-to-failures of components of data processing systems from data processing system logs. A system in accordance with an embodiment may include data processing system manager 110. Data processing system manager 110 may manage the operation of data processing systems 100.

To provide its functionality, data processing system manager 110 may (i) obtain logs for the hardware and/or software components of data processing systems 100, (ii) predict future failures based on the logs (e.g., using a trained inference model), (iii) utilize one or more trained inference models to predict a time-to-failure for the future failure of one or more components of one or more data processing systems, and/or (iv) initiate performance of one or more actions (e.g., an "action set") to remediate potential undesirable operation and/or reduce the likelihood of data processing systems 100 operating in an undesirable manner in the future.

By doing so, a system in accordance with embodiments disclosed herein may provide data processing systems having, for example, (i) decreased downtime (e.g., downtime due to hardware failure), (ii) improved user experiences by avoiding phantom slowdowns and/or pauses (e.g., due to undesired operating behavior), and/or (iii) improve computing resource availability for desired computer implemented services by reducing computing resource expenditures for management and/or remedial action.

Figure 3:
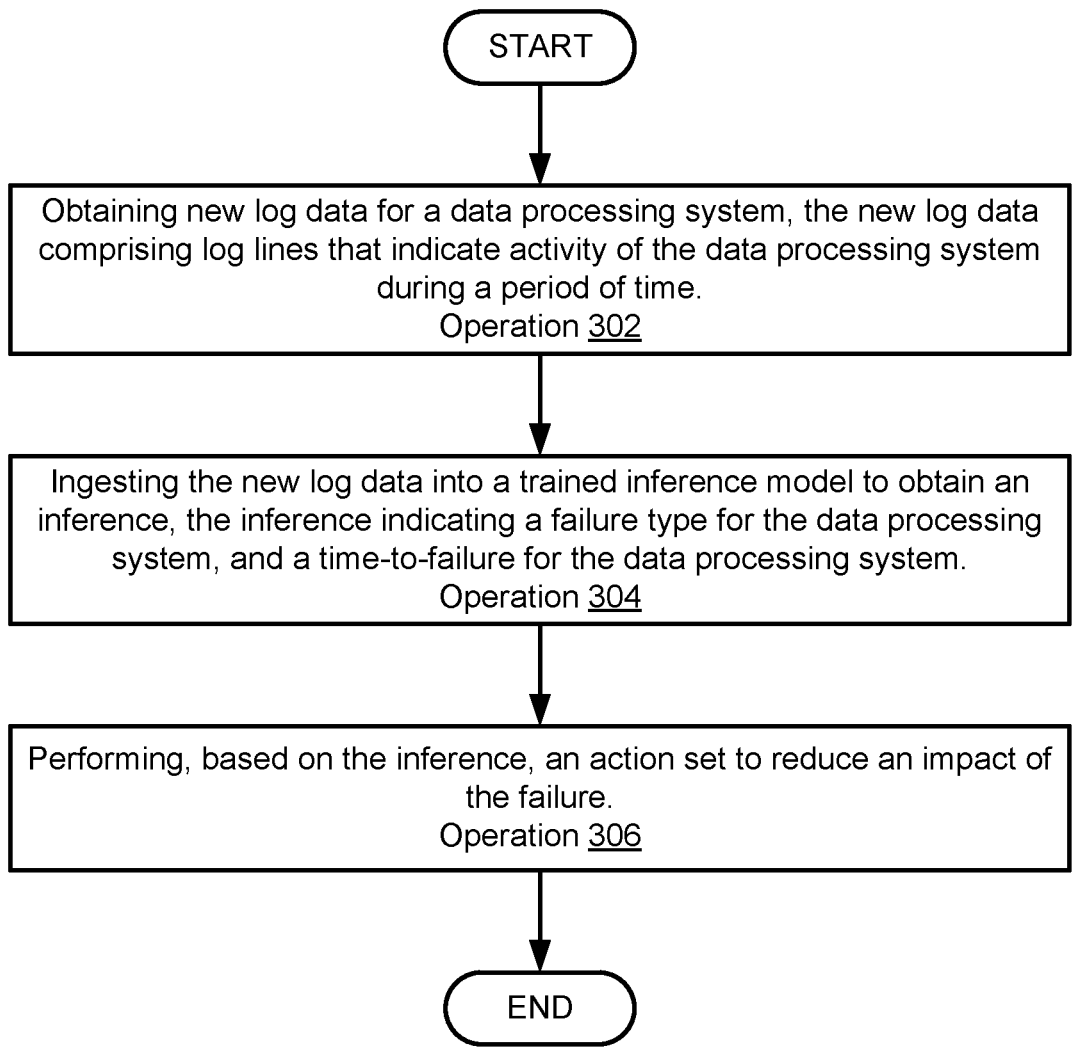
FIG. 3 shows a flow diagram illustrating a method of managing a failure of a data processing system in accordance with an embodiment.

When providing its functionality, data processing system manager 110 may perform all, or a portion, of the method and/or actions shown in FIG. 3.

Data processing systems 100 and/or data processing system manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Turning to FIG. 2A, a first data flow diagram in accordance with an embodiment is shown. The data flow diagram may illustrate the generation of inference models in a system similar to that of FIG. 1. The inference models may provide computer implemented services (e.g., inference generation) for downstream consumers. A data processing system may, over time, generate inference models for various purposes. For example, inference models may generate inferences that may be used to recognize patterns, automate tasks, and/or make decisions.

The inference models may, for example, be implemented with artificial neural networks, decision trees, support-vector machines, regression analysis, Bayesian networks, genetic algorithms, and/or any other type of model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a multi-layered neural network may process a large amount of complex data and generate highly accurate inferences, but may be costly to train and maintain and may have low explainability (e.g., may act as a "black box"). In contrast, a linear regression model may be a simpler, less costly inference model with high explainability, but may only be well-suited for data whose labels are linearly correlated with the selected features and may generate less accurate inferences than a neural network.

Once an inference model type is selected, the inference model must be trained using training data that may be acquired from various data sources (e.g., various data processing systems). FIG. 2A shows training data gathered from log data 202 and data sources 204. Log files from log data 202 and data from data sources 204 may be acquired from one or more data processing systems 100.

Log data 202 may be obtained from any number of data processing systems managed by data processing system manager 110. Log data 202 may include any type and quantity of logs, and may include descriptions of actions leading up to an event, and/or a description of an event (e.g., an undesirable operation and/or a normal operation). Log data 202 may be implemented with structured or unstructured data and may include any number of past logs (e.g., historical logs). These historical logs may relate to historical failure information collected from data sources 204.

Data sources 204 may include (i) systems and/or databases that store trouble tickets (e.g., helpdesk databases), (ii) a data processing system that hosts a component for which a past failure has occurred (e.g., the management controller of the data processing system), (iii) the supplier of a component for the data processing system (e.g., a manufacturer that has verified a faulty component), (iv) and/or other sources of failure information that may be associated with log data 202.

Training data preparation process 206 may collect training data such as full log files (e.g., historical log files) from log data 202, and/or failure information (e.g., types and/or times of past failures) from data sources 204. The full log files may include log patterns that may be related to past failures of data processing systems and/or components thereof, and the past failures may be associated with a time of failure.

Training data preparation process 206 may include verifying and/or performing data labeling (e.g., associating two or more data samples from the collected training data). For example, a full log file (e.g., input) may be associated with a past failure type (e.g., output). However, labeled training data may not always be reliable (e.g., a data sample may be improperly labeled by a user) and, if incorrectly labeled training data is used to train an inference model, the trained inference model may generate inaccurate inferences. Thus, the quality of training data labels may be verified as part of training data preparation process 206. For example, unreliable labels may be removed from a portion of training data and that portion of training data may be implemented as unlabeled data during training.

The prepared training data from training data preparation process 206 may be stored in training data repository A 208. Any of the training data from training data repository A 208 may relate log files from log data 202 to failure information from data sources 204, thereby including any portion of labeled data. Training data may also include unlabeled data and, thus, an association between log data 202 and data sources 204 may not be known.

Training data repository A 208 may include any number of training datasets. The training datasets may be used to train an inference model to generate a prediction (e.g., an inference) regarding a potential future failure of some component of the data processing system, based on ingested data (e.g., log data 202).

Untrained inference model A 210 may be trained using training data (e.g., from training data repository A 208). To do so, untrained inference model A 210 and the training data may be input to inference model training process 212.

Inference model training process 212 may employ machine-learning techniques such as supervised learning (e.g., for labeled training data), and/or unsupervised learning (e.g., for unlabeled data) to produce any number of trained inference models, including trained inference model A 214. The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained using inference model training process 212.

Trained inference model A 214 may attempt to map an input dataset to a desired output dataset (e.g., generate inferences). The inferences may be generated from ingest data that may differ from the training data that was used to train trained inference model A 214. For example, trained inference model A 214 may be used to analyze new logs (e.g., real-time logs) from a data processing system and may detect a future failure recorded in the new logs.

For example, trained inference model A 214 may be a classification inference model and may classify log files from log data 202 based on whether the log indicates a failure may occur and/or by failure type (e.g., failure classification). The failure type may indicate a component (e.g., a hardware component) of the data processing that may be subject to a future failure (e.g., is predicted to fail based on the log file).

Over time, the trained inference models may need to be updated for a variety of reasons. For example, the trained inference models may become inaccurate, may not provide desired types of inferences, etc. Consequently, trained inference models (e.g., trained inference model A 214) may be periodically replaced and/or updated.

Thus, as illustrated in FIG. 2A, the system of FIG. 1 may obtain and/or train inference models used for the detection of future failures based on log data of the data processing system. However, the detection of future failures alone may not be sufficient to determine effective solutions to manage component failures, especially in more complex cases (e.g., where multiple component failures are predicted and/or when predicted failures may be directly related). Thus, further analysis of relationships between log files and failure information may be performed to predict additional failure information such as time-to-failure.

Figure 2B:
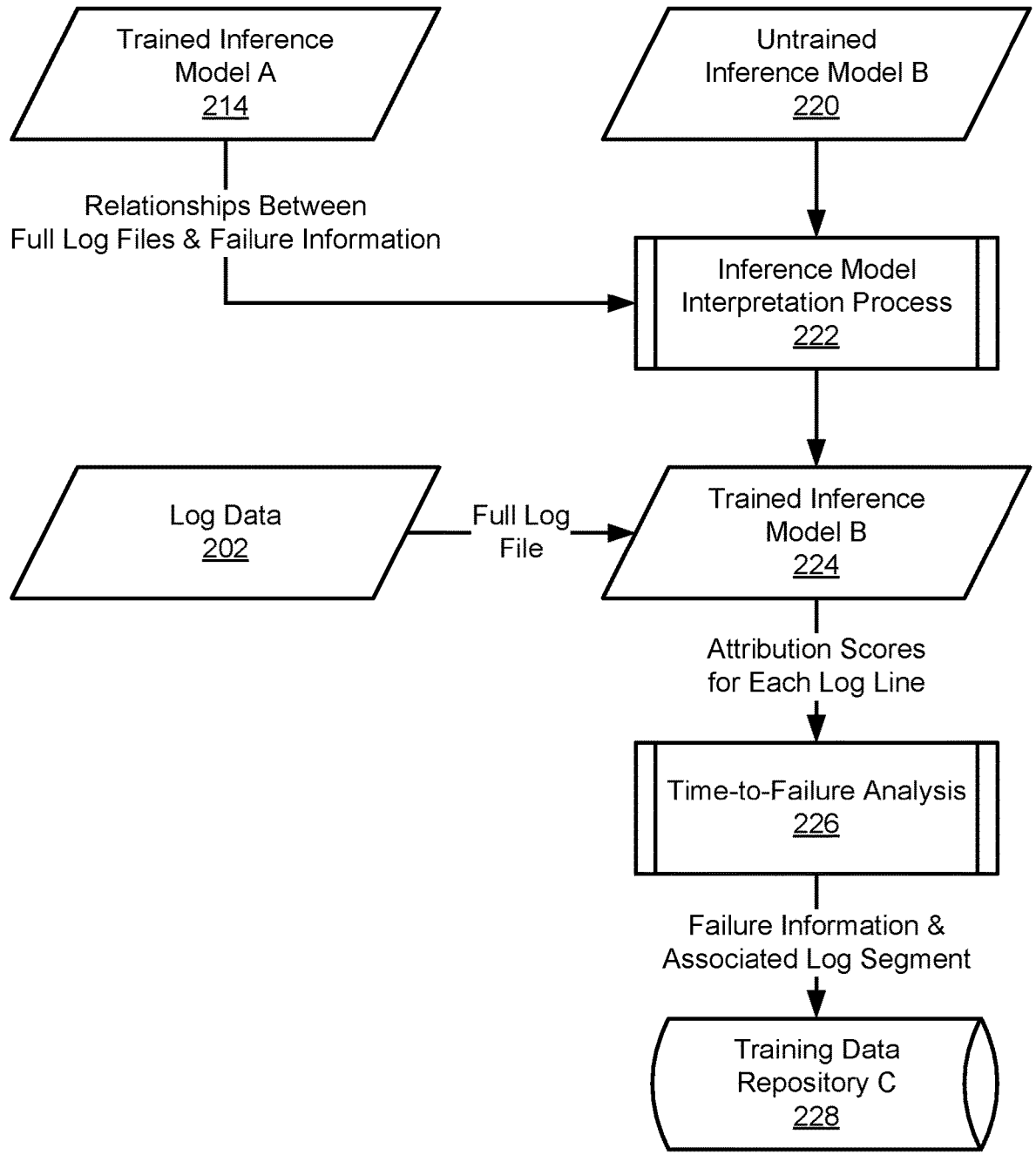
FIG. 2B shows a data flow diagram illustrating a process of obtaining a time-to-failure of a data processing system in accordance with an embodiment.

Turning to FIG. 2B, a second data flow diagram in accordance with an embodiment is shown. The data flow diagram illustrates a process of obtaining a time-to-failure of a data processing system. As previously mentioned, the time-to-failure for a predicted failure may be determined through analysis of attribution scores of log lines (e.g., of a log file) that may contribute to a predicted failure.

To obtain attribution scores, trained inference model A 214 may be interpreted using an interpretation framework during inference model interpretation process 222. Relationships between full log files and failure types (e.g., defined by the architecture and parameters of trained inference model A 214) may be interpreted using an inference model interpretation framework. The inference model interpretation framework may perform local feature attribution using various methods (e.g., SHAP, Grad-CAM, etc.). The feature attribution method may output the relevance (e.g., contribution) of each input feature of the inference model to an output feature (e.g., an inference generated by the inference model).

For example, local feature attribution performed on trained inference model A 214 may output an attribution score for every line of a full log file for any number of predicted failures. The attribution scores may be used to identify the portions of the log file that most impact the classification score (e.g., failure type) predicted by trained inference model A 214. An positive attribution score may indicate the amount that the log line contributes to the failure type), and a zero attribution score may indicate that the log line may have no contribution to the failure type.

As part of model interpretation process 222, untrained inference model B 220 may be trained using training data generated from model interpretation process 222 (e.g., training data that relates log lines and attribution scores for one or more failure types). Untrained inference model B 220 may be trained using a training method similar to the one described in FIG. 2A. Once trained, trained inference model B 224 may assign attribution scores to each log line of an ingested full log file obtained from log data 202. Any number of trained inference models may be generated using model interpretation process 222.

The attribution scores (e.g., for each failure type) for each log line may be input to time-to-failure analysis 226. Time-to-failure analysis 226 may perform a statistical analysis (e.g., computations of sums, standard-deviations, medians, and/or means) of the attribution scores for each log line of the full log file to identify log segments (e.g., smaller portions of the full log file) that contribute to one or more predicted failure types.

Some log lines of the log file may contribute to a predicted failure more than other log lines; therefore, to determine which portions of the log file contribute to a potential failure (e.g., and to predict which future failure is most likely), aggregate attribution scores may be derived. The aggregate attribution scores may be used to define a log segment (e.g., portion of the full log file) associated with a failure type. The defined log segment may include a pattern within the log file that relates to the occurrence of a predicted failure.

For example, a cumulative sum of attribution scores may be determined for each consecutive log line of the full log file for each failure type. The cumulative sum may represent the temperature of each log line (e.g., a heat map), denoting which log lines in the log file contribute to a predicted failure type. Log lines that have lower temperature values (e.g., lower cumulative attribution scores) may not contribute significantly to a future failure (e.g., may not indicate a future failure), whereas log lines that have higher temperature values may contribute significantly to the future failure. Log segments (e.g., groups of log lines) with higher temperatures (e.g., strong indications of a future failure) may be defined using virtual markers.

Virtual markers may be placed within a log file based on multiple attribution thresholds (e.g., defined by a user and/or based on statistical analysis). The virtual markers may be positioned throughout the full log file. For example, a first virtual marker may be positioned at the first log line in the log file that has a temperature exceeding a minimum threshold, the first virtual marker indicating the beginning of a log segment. A second virtual marker may be positioned at a log line in the full log file (e.g., subsequent to the position of the first virtual marker) based on a time of failure (e.g., the time at which the predicted failure occurred). The time of failure may be supplied by data sources 204 (refer to FIG. 2A) as part of the failure information associated with the failure type. The second virtual marker may be positioned at a log line that has a timestamp that matches and/or is nearest the supplied time of failure.

A third virtual marker may be positioned between the first and second virtual markers. The third virtual marker may be positioned based on a threshold that may be determined based on a maximum aggregate score for the log file (e.g., a total cumulative sum of scores of every log line of the log segment). For example, a third virtual marker may be positioned at the first log line of the log segment that has a temperature exceeding a maximum threshold (e.g., 75% of the total cumulative sum for the segment). Any number of virtual markers may be placed within the log segment to define a portion of the log (e.g., the log segment) and any sub-portions thereof. For example, the third virtual marker may indicate an end of the log segment (e.g., when used for predicting future failures), and/or the second virtual marker may indicate an end of the log segment (e.g., when used to determine the time-to-failure).

Time-to-failure analysis 226 may determine a time-to-failure based on one or more virtual markers positioned within the full log file. For example, the time-to-failure may be calculated by subtracting the timestamp value at the third virtual marker from the timestamp value at the second virtual marker (e.g., the time of failure). The failure type, time-to-failure, and/or the associated log segment (e.g., defined by the first and third virtual markers) may be stored in training data repository C 228. The training data stored in training data repository C 228 may be used to train an inference model that predicts failure information (e.g., failure type and/or time-to-failure) based on ingested log segments.

Thus, as illustrated in FIG. 2B, the system of FIG. 1 may obtain and/or train an inference model that may generate attribution scores for log lines of ingested full log files. The system of FIG. 1 may also generate and/or obtain the attribution scores to determine the time-to-failure for a future failure.

Figure 2C:
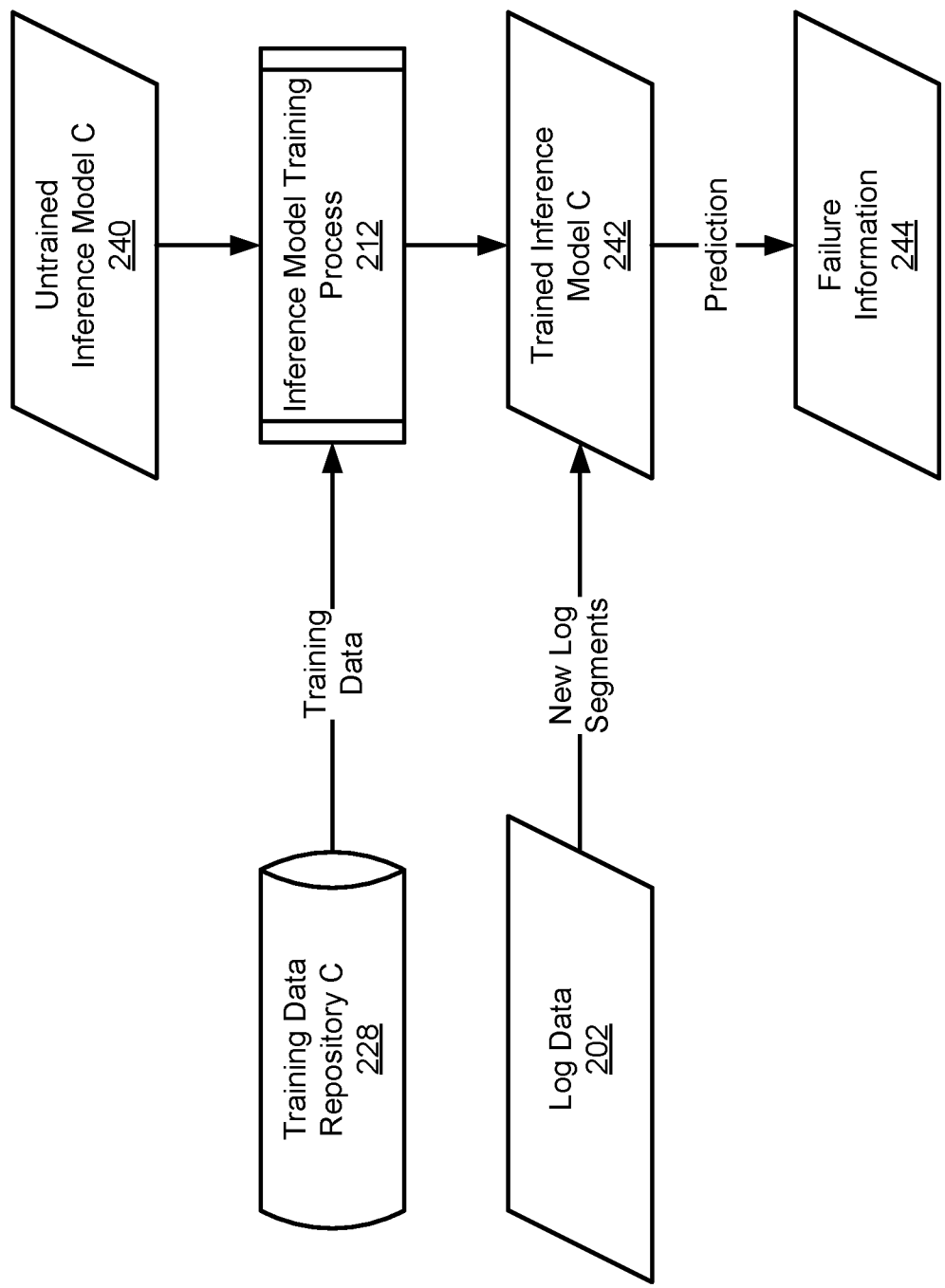
FIG. 2C shows a data flow diagram illustrating a process of determining failure information for a data processing system in accordance with an embodiment.

Turning to FIG. 2C, a third data flow diagram in accordance with an embodiment is shown. The data flow diagram illustrates a process of determining failure information for a data processing system in accordance with an embodiment. To predict failure information, an inference model may be trained using relational data stored in training data repository C 228.

Untrained inference model C 240 may undergo inference model training process 212 using training data from training data repository 228 C. The training process may be similar to the training process described with respect to FIG. 2A. The training data may relate log segments (e.g., portions of full log files) to a future failure type and/or time-to-failure. Trained inference model C 242 may be trained to predict failure information from ingest data (e.g., log segments).

For example, trained inference model C 242 may be a regression inference model and may predict a future failure type and the time-to-failure based on an ingested log segment. The log segment may be a portion of a full log file, and the portion may be defined by the placement of two virtual markers (as described with respect to FIG. 2B). The predictions (e.g., inferences) obtained from trained inference model C 242 may be reported (e.g., to a system administrator) as failure information 244. Trained inference model C 242 may generate the predictions based on ingestion of a new log segment from log data 202. The new log segment may be log data that is not included in training data used to train trained inference model C 242.

New log segments obtained from log data 202 may be portions of log files (e.g., real-time log files). For example, a log segment may be a 5-minute segment of a full log file that may be days or weeks long. The log segments may be more efficiently ingested (e.g., read in parallel) and analyzed by trained inference model C 242 than a full log file. This increase in efficiency may result in an effective and efficient method of predicting failure type and/or time-to-failure, allowing for improved methods for managing future failures and monitoring data processing system health.

Data processing system health may be monitored using cumulative health scores. The health scores may be based on attribution scores determined from input logs, the attribution scores having been determined for each component (e.g., possible failure type) of the data processing systems. An aggregation function (e.g., straight sum, mean, and/or weighted sum) may be used to derive a cumulative health score. For example, attribution scores for multiple failure types may be aggregated using a weighted sum that weights integral components of a data processing system more than secondary components. The weighted sum may be normalized based on minimum and maximum attribution scores for any and/or all components. The health score of the data processing system may be used as a global indicator of the level of risk of failure of one or more data processing systems.

The components of FIG. 1 may perform methods to detect future failures, determine associated times-to-failures, and determine health scores based on short log segments from data processing systems that provide computer implemented services.

FIG. 3 shows a flow diagram illustrating a method of managing a failure of a data processing system in accordance with an embodiment. The method may be performed by the system of FIG. 1. Any of the operations described with respect to FIG. 3 may be performed in different orders, skipped, repeated, and/or be performed in a parallel or partially overlapping in time manner.

At operation 302, new log data for a data processing system (e.g., of the data processing systems 100) may be obtained. The new log data may be obtained by (i) receiving the new log data from one or more data processing systems (e.g., which may generate and provide the logs in real-time), (ii) reading the new log data from storage, and/or (iii) receiving the new log data from another device (e.g., from devices which may aggregate logs for other devices). Any quantity of new log data may be obtained. The new log data may be obtained via network communications between the data processing system manager and other devices.

The new log data may include a real-time log file (e.g., not a historical log file), and may include one or more log segments (e.g., sequences of log messages). The new log data may include log lines that indicate activity of the data processing system during a period of time. The log may include information such as timestamps (e.g., the time of an operation and/or log message), a log message identifier, log message severity (e.g., warning, failure, etc.), log message text, and/or data processing system information.

Prior to obtaining the new log data, a training process to obtain a trained inference model may be performed. The process may include obtaining a first training data to train a first inference model. The first training data may relate historical log data (e.g., historical log files) to historical failure data. In other words, the historical failure data may indicate types of past failures of data processing systems associated with the historical log files. The first inference model may be trained using the first training data and a method similar to that described with respect to FIG. 2A. The trained first inference model may be trained to generalize relationships defined by the historical log files with associated types of past failures (e.g., historical failures) of data processing systems. The first inference model may be able to generate a first prediction regarding the failure type of a predicted failure based on ingested log data.

A second inference model may be obtained based on the first inference model using an inference model interpretation framework, in a process similar to that described with respect to FIG. 2B. The second inference model may be trained to generate a second prediction regarding the time-to-failure of the predicted failure type upon ingestion of log data (e.g., historical log data). Any of the second predictions generated (e.g., upon ingestion of historical log data) by the second inference model may include attribution scores associated with each log line of ingested historical log data. The attribution scores may be based on interpretations of the first trained inference model and the interpretations may indicate levels of contribution of the log lines of the historical log files to occurrences of historical failures. Each of the occurrences of the historical failures may be associated with the portion of the log lines (e.g., the log segment) corresponding to the historical failures.

The attribution scores may be analyzed using a process similar to time-to-failure analysis 226 (refer to the discussion of FIG. 2B) to predict a failure type and generate the time-to-failure for the predicted failure type. As part of this analysis, the attribution scores may be used to define virtual markers that may further define the log segments that relate to the predicted failure type.

The times-to-failures may be based on a sub-portion of the log segment (e.g., defined using virtual markers). The log lines within the log segment may include an aggregate level of contribution (e.g., a cumulative sum of the level of contribution) that exceeds a threshold. The times-to-failures corresponding to the respective occurrences of the historical failures may be based on time deltas (e.g., may be determined using subtraction) between a most recent log line of the sub-portion of the portion of the log lines (e.g., indicated by a virtual marker) and the respective occurrences of the historical failures.

The predictions and related ingest data (e.g., the defined log segments) generated by the second inference model may be collected and stored as a second training data. The second training data may include the first prediction (e.g., failure type of a predicted failure) and the second prediction (e.g., time-to-failure of the predicted failure). The second training data may be used to train a third inference model to predict failure information (e.g., failure type and time-to-failure) based on smaller portions of new ingest data (e.g., new log segments). An inference model training process that may be used to train the third inference model is described with respect to FIG. 2C.

At operation 304, the new log data may be ingested into a trained inference model (e.g., the third inference model obtained in Operation 302) to obtain an inference. The log data may be ingested into the trained inference model by feeding the new log data to the trained inference model. The new log data may be a log segment (e.g., a 5-minute log segment) and may be a portion of a real-time log generated by the data processing system. More than one log segment of the new log data may be fed to the inference model at different times, and/or each log segment may be a different length.

The inference may be obtained from the trained inference model once any number of log segments is ingested by the trained inference model. The trained inference model may be trained using training data that includes relationships between portions of log lines of the historical log files and times-to-failures corresponding to historical failures of the data processing systems. Further, the training data may be based on attribution scores for each log line of the portions of the log lines.

The trained inference model may be similar to trained inference model C 242 (as described with respect to FIG. 2C) and may generate a prediction regarding one or more future failures (e.g., inferences) that includes failure types and/or associated times-to-failures.

At operation 306, an action set may be performed, based on the inference (e.g., the failure information), to reduce an impact of the failure. The action set may be performed by (i) notifying an administrator a predicted future undesired operation (e.g., a predicted component failure), (ii) performing a reconfiguration of a data processing system based on the predicted future undesired operation and/or any component(s) predicted to fail, (iii) transferring workloads from the data processing system to other data processing systems, (iv) disabling a function of a data processing system, (v) disabling a hardware and/or software component of the data processing system, (vi) replacing one or more components of the data processing system, and/or (vii) performing other actions that may reduce the likelihood of the data processing system being impaired in the future (e.g., to avoid a potential future undesired operation), allow administrators or other persons to locate the potential source and/or time of initiation of an issue that may lead to the potential future undesired operation, and/or for other purposes.

Performance of a remediation action set may be initiated to manage and/or reduce an impact of a potential undesired operation (e.g., a future failure) of the data processing system. The remediation action set may be based on time-to-failure and/or failure type, which may be helpful in planning and/or optimizing cost-effective measures for reducing the impact of a future failure.

The method may end following operation 306.

Thus, as illustrated above, embodiments disclosed herein may provide systems and methods usable to manage predicted failures of data processing systems based on indications of potential future failures recorded in logs. By utilizing trained inference models to analyze log segments obtained from data processing systems, future undesired operations (e.g., due to component failures) of the data processing systems may be anticipated and mitigated efficiently. Additionally, the prediction of the time-to-failure of the predicted future failure may allow for targeted and efficient (e.g., cost efficient) remediation strategies.

Thus, embodiments disclosed herein may provide an improved computing device that is able to extract useful information from log data, usable for management purposes. Further, the disclosed process may facilitate identification of relationships that a person may easily overlook. Accordingly, the disclosed process provides for both an embodiment in computing technology and an improved method for device management. Rather than relying on a person's intuition or expert knowledge, an automated process for analysis may be provided.

Figure 4:
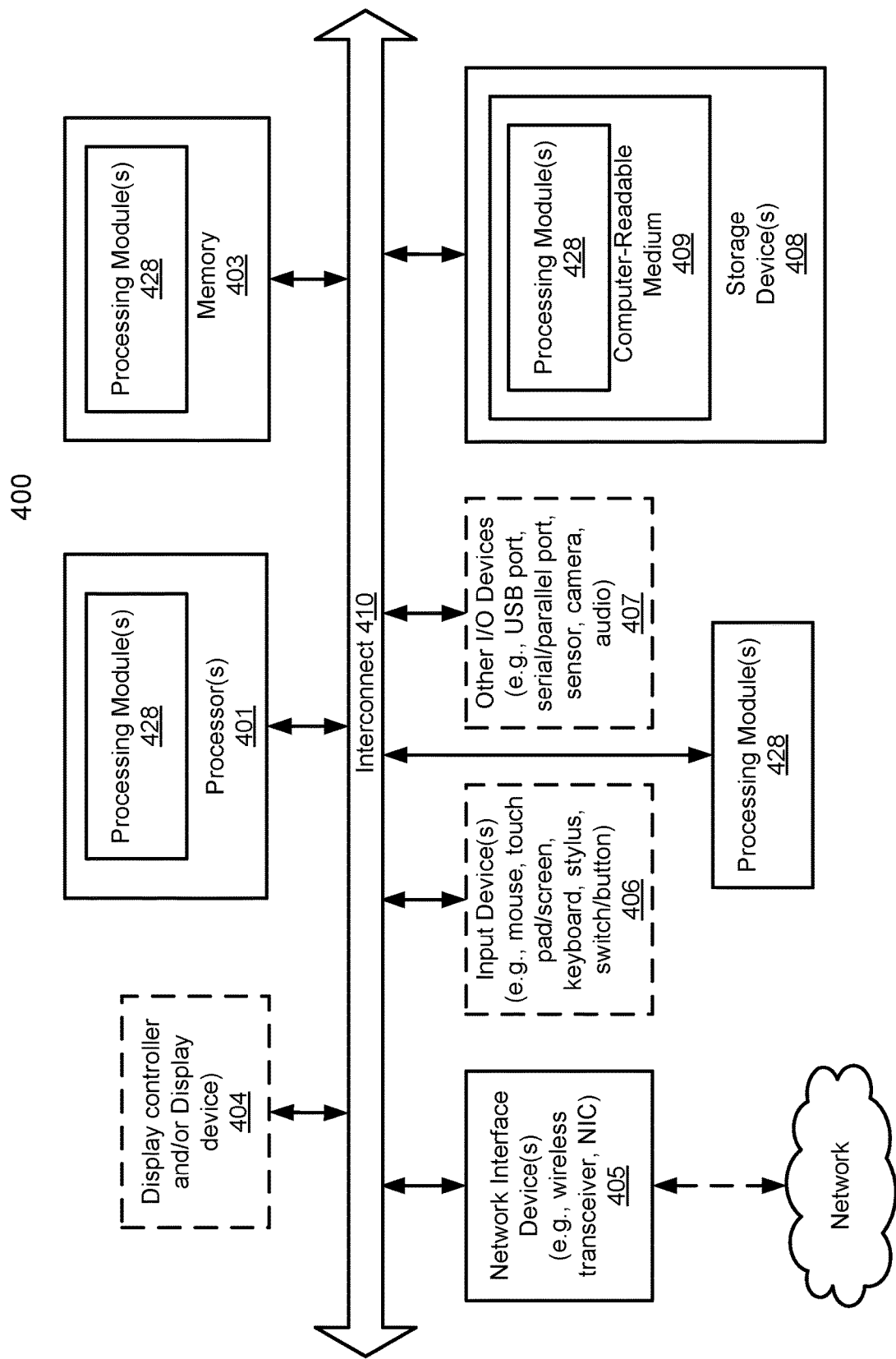
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for training a future failure prediction model used by a data processing manager configured to manage data processing systems based on indications of a failure, the method being performed by a computing device and comprising:

by a processor of the computing device:
performing a multi-inference model training process to obtain a first trained inference model that generates predicted future failures of one or more of the data processing systems, the first trained inference model being the future failure prediction model used by the data processing manager to manage the data processing systems, and the multi-inference model training process comprises:
training a first inference model using log lines of historical log files associated with the data processing systems to obtain a second trained inference model that is configured to generate one or more failure types that could happen to the data processing systems;

creating second training data comprising the one or more failure types and attribution scores for each log line of portions of the log lines, the attribution scores being generated based on the one or more failure types;

training a second inference model using the second training data to obtain a third trained inference model that is configured to generate relationships between the portions of the log lines and times-to-failures that correspond to historical failures of the data processing systems;

creating third training data comprising the relationships, the times-to-failures that correspond to the historical failures of the data processing systems, the attribution scores, and the one or more failure types; and training a third inference model using the third training data to obtain the first trained inference model.

2. The method of claim 1, wherein the attribution scores are based on interpretations of the second trained inference model, and the interpretations indicating levels of contribution of the log lines of the historical log files to occurrences of the historical failures.

3. The method of claim 2, wherein each of the occurrences of the historical failures are associated with the portion of the log lines corresponding to the historical failures, and the times-to-failures corresponding to respective occurrences of the historical failures being based on a sub-portion of the portion of the log lines having an aggregate level of contribution based on the levels of contribution that exceeds a threshold.

4. The method of claim 3, wherein the aggregate level of the contribution is a cumulative sum of the levels of contribution.

5. The method of claim 4, wherein the times-to-failures corresponding to the respective occurrences of the historical failures are based on time deltas between a most recent log line of the sub-portion of the portion of the log lines and the respective occurrences of the historical failures.

6. The method of claim 1, wherein the first trained inference model, the second trained inference model, and the third trained inference model are all trained machine learning models.

7. The method of claim 6, wherein the first trained inference model is a regression inference model, the second trained inference model, and the third trained inference models are classification inference models.

8. The method of claim 1, wherein the attribution scores are generated through application of an inference model interpretation framework to the one or more failure types generated by the second trained inference model.

9. The method of claim 8, wherein the inference model interpretation framework is at least one of SHapley Additive explanations (SHAP) or Gradient-Weighted Class Activation Mapping (Grad-CAM).

10. A non-transitory machine-readable medium having instructions stored therein, which when executed by a processor of a data processing system manager, cause the processor to perform operations for training a future failure prediction model used by the data processing manager to manage data processing systems based on indications of a failure, the operations comprising:

performing a multi-inference model training process to obtain a first trained inference model that generates predicted future failures of one or more of the data processing systems, the first trained inference model being the future failure prediction model used by the data processing manager to manage the data processing systems, and the multi-inference model training process comprises:

training a first inference model using log lines of historical log files associated with the data processing systems to obtain a second trained inference model that is configured to generate one or more failure types that could happen to the data processing systems;

creating second training data comprising the one or more failure types and attribution scores for each log line of portions of the log lines, the attribution scores being generated based on the one or more failure types;

training a second inference model using the second training data to obtain a third trained inference model that is configured to generate relationships between the portions of the log lines and times-to-failures that correspond to historical failures of the data processing systems;

creating third training data comprising the relationships, the times-to-failures that correspond to the historical failures of the data processing systems, the attribution scores, and the one or more failure types; and training a third inference model using the third training data to obtain the first trained inference model.

11. The non-transitory machine-readable medium of claim 10, wherein the attribution scores are based on interpretations of the second trained inference model, and the interpretations indicating levels of contribution of the log lines of the historical log files to occurrences of the historical failures.

12. The non-transitory machine-readable medium of claim 11, wherein each of the occurrences of the historical failures are associated with the portion of the log lines corresponding to the historical failures, and the times-to-failures corresponding to respective occurrences of the historical failures being based on a sub-portion of the portion of the log lines having an aggregate level of contribution based on the levels of contribution that exceeds a threshold.

13. The non-transitory machine-readable medium of claim 12, wherein the aggregate level of the contribution is a cumulative sum of the levels of contribution.

14. The non-transitory machine-readable medium of claim 13, wherein the times-to-failures corresponding to the respective occurrences of the historical failures are based on time deltas between a most recent log line of the sub-portion of the portion of the log lines and the respective occurrences of the historical failures.

15. A data processing system manager, comprising:
a processor, and
a memory coupled to the processor to store instructions, which when executed by the processor, cause the processor to perform operations for training a future failure prediction model used by the data processing manager to manage data processing systems based on indications of a failure, the operations comprising:

performing a multi-inference model training process to obtain a first trained inference model that generates predicted future failures of one or more of the data processing systems, the first trained inference model being the future failure prediction model used by the data processing manager to manage the data processing systems, and the multi-inference model training process comprises:
training a first inference model using log lines of historical log files associated with the data processing systems to obtain a second trained inference model that is configured to generate one or more failure types that could happen to the data processing systems;
creating second training data comprising the one or more failure types and attribution scores for each log line of portions of the log lines, the attribution scores being generated based on the one or more failure types;
training a second inference model using the second training data to obtain a third trained inference model that is configured to generate relationships between the portions of the log lines and times-to-failures that correspond to historical failures of the data processing systems;
creating third training data comprising the relationships, the times-to-failures that correspond to the historical failures of the data processing systems, the attribution scores, and the one or more failure types; and
training a third inference model using the third training data to obtain the first trained inference model.

16. The data processing system of claim 15, wherein the attribution scores are based on interpretations of the second trained inference model, and the interpretations indicating levels of contribution of the log lines of the historical log files to occurrences of the historical failures.

17. The data processing system of claim 16, wherein each of the occurrences of the historical failures are associated with the portion of the log lines corresponding to historical failures, and the times-to-failures corresponding to respective occurrences of the historical failures being based on a sub-portion of the portion of the log lines having an aggregate level of contribution based on the levels of contribution that exceeds a threshold.

18. The data processing system of claim 17, wherein the aggregate level of the contribution is a cumulative sum of the levels of contribution.

19. The data processing system of claim 18, wherein the times-to-failures corresponding to the respective occurrences of the historical failures are based on time deltas between a most recent log line of the sub-portion of the portion of the log lines and the respective occurrences of the historical failures.

20. The data processing system of claim 15, wherein the first trained inference model, the second trained inference model, and the third trained inference model are all trained machine learning models.

* * * * *